United States Patent [19]
Dyatlov et al.

[11] 3,846,716
[45] Nov. 5, 1974

[54] METHOD OF REGULATING LIGHT EMITTING POWER OF LASER AND APPARATUS FOR EFFECTING SAME

[76] Inventors: Mikhail Konstantinovich Dyatlov, ulitsa Lenina, 13-a, kv. 45; Evgeny Petrovich Ostapchenko, ulitsa Schedrina, 4, kv. 58; Vladimir Anatolievich Stepanov, ulitsa Schedrina, 4, kv. 61; Jury Nikolaevich Kulikov, ulitsa Libknekhta, 95, all of Ryazan, U.S.S.R.

[22] Filed: July 3, 1973

[21] Appl. No.: 376,206

[52] U.S. Cl. ............................................. 331/94.5
[51] Int. Cl. ............................................ H01s 3/09
[58] Field of Search ................... 331/94.5; 330/4.3

[56] References Cited
UNITED STATES PATENTS
3,639,804   2/1972   Hernqvist ..................... 331/94.5

*Primary Examiner*—William L. Sikes
*Attorney, Agent, or Firm*—Waters, Roditi, Schwartz & Nissen

[57] ABSTRACT

A DC electric field is applied to the laser medium of a gas laser of the chemical element vapour type, whereby this medium is brought into an excited state providing for stimulated radiation. Simultaneously, an AC field is applied to the same medium, the frequency of this field being varied within the range of frequencies of unsteady oscillations of said laser medium, in which the power of the light emission is varied.

The source of said AC field may be either an AC source connected to the electrodes of a gas discharge tube in series with a DC source or an alternating voltage source connected in parallel with a DC source.

11 Claims, 4 Drawing Figures

METHOD OF REGULATING LIGHT EMITTING POWER OF LASER AND APPARATUS FOR EFFECTING SAME

The present invention relates to quantum electronics, and more particularly to a method of regulating the light emetting power of a laser the medium whereof includes an inert gas with vapours of chemical elements, and to an apparatus for effecting same.

Widely known are lasers comprising an optical resonator accomodating a gas discharge tube filled with a laser medium capable of stimulated radiation when a DC discharge is initiated in this tube. It has become a standard practice of late to use a mixture of an inert gas and vapours of metals or metalloids as said laser medium capable of stimulated radiation. There is known a relatively great variety of such mixtures, e.g. He - Se, He - Zn, He - Mg, He - Hg, Ne - Cd, etc. Lasers using such mixtures are known in the art as "metal- or metalloid-vapour lasers" or as "chemical element vapour lasers".

There are known various methods of regulating the power of the light emission of gas lasers of the above-described type. For instance, regulating is effected by varying the current intensity of a DC discharge which determines the power of light emission; in other known methods, regulating is effected by varying the pressure either of the metal or metalloid vapours or of the inert gas. The power of light emission may also be regulated by introducting additional losses into the resonator or by placing an attenuator in the path of the light emission.

All the above known methods suffer from a common disadvantage residing in that they are incapable of increasing the emissive power above a value attained when all the above parameters are optimal for the performance of the laser.

Furthermore, each of the above methods is not free from some disadvantages peculiar to this particular method. A disadvantage of the known method of regulating the power of light emission of the above-specified gas laser by varying the discharge current is its slow response. When the discharge current is varied, the pressure of the metal or metalloid vapours varies, too, on account of the varying conditions of heat exchange between the gas discharge tube and the ambient air, as a result of which a rapid variation of the discharge current occuring at the initial moment brings about an ambiguous variation of the light emitting power, i.e. it may either rise or fall, depending on the actual conditions of the discharge. Therefore, the emissive power may be regulated by this method but slowly, with a substantially delayed response.

The above method of regulating the light emitting power of the prior art gas laser by varying the pressure of the metal or metalloid vapour is likewise characterized by show response since the time needed to stabilize the temperature of the gas discharge tube and, consequently the vapour pressure is relatively long.

The method of regulating the light emitting power of the above gas laser by varying the pressure of the inert gas is also characterized by slow response and is most inconvenient.

The methods of regulating the light emitting power, based on the introduction of additional losses into the resonator and on placing a light attenuator in the path of the emission ensure faster response. However, these methods either lead to considerable waste of the emissive power or involve the incorporation of movable mechanical parts that complicate the operation and affect its reliability. Besides, the mechanical parts impair the quality of the light emission of a gas laser, since they are apt to introduce unwanted additional changes into the pattern and uniformity of the light emission.

It is an object of the present invention to provide a method of regulating the power of light emission of gas lasers of the chemical element vapour type, which will enable the light emitting power to be varied from its minimum value to the maximum value and vice versa with fast response and without affecting the quality of the light emission.

Another object of the present invention is to increase the power of light emission above the value corresponding to optimal parameters of the performance of the laser.

Still another object of the present invention is to improve the noise characteristic of the light emission of a laser.

These and other objects are attained by that in a method of regulating the light emitting power of a gas laser comprising a discharge tube filled with an inert gas and vapours of chemical elements, acting as a laser medium capable of stimulated radiation when a DC electric discharge is initiated therein, applied to said laser medium is in accordance with the invention, an AC electric field, the frequency whereof is varied within the range of frequencies of unsteady oscillations of said laser medium upon initiation therein of a DC electric discharge, whereby the variation of said frequency of said AC electric field is followed by a variation in the power of the light emission of said laser.

The herein-disclosed method of regulating the light emitting power of a gas laser of the chemical element vapour type is characterized by a substantially faster response than the hitherto known methods, the herein-disclosed method additionally providing for increasing the light emitting power at least twofold as compared with the case when no regulating is effected at all. Moreover, the presence of an AC electric signal considerably reduces the noise in the light emission of the laser caused by the unsteady oscillations of the laser medium when a DC discharge is initiated therein. This reduction of the noise is attained to such an extent that when the light emission reaches its maximum value, the noise value is reduced by two orders of magnitude. Furthermore, the herein-disclosed method of regulating does not involve any changes into the pattern and uniformity of the light emission. Finally, it should be borne in mind that the herein-disclosed method provides for stabilization of the light emitting power of a laser with the help of simple technical means.

It is advisable that the frequency of the AC field used for regulating the power of light emission of a laser between the minimum and maximum values should range from 40 to 220 kHz.

In the case of a laser having for its medium a mixture of helium and cadmium vapours, the full regulating range is effected with an AC field frequency variation from 80 to 110 kHz.

The light emitting power may be regulated by varying both the current and the voltage of the AC field; best results are obtained when the value of the current or voltage of the AC field is about 0.01 of the amplitude of the current or voltage of the DC field.

The herein-disclosed method may be effected by an apparatus for regulating the light emitting power of a gas laser of the chemical element vapour type, comprising a gas discharge tube with electrodes, a DC source adapted to be connected to the electrodes of the gas discharge tube and also comprising, in accordance with the present invention, a source of sinusoidal alternating current, the frequency whereof is adjustable within a range corresponding to that of frequencies of unsteady oscillations of the laser medium of said laser, said last-mentioned source being connectable to said electrodes of said gas discharge tube in series with said DC source.

The DC and AC sources in the herein-disclosed apparatus may be interconnected through the medium of a transformer having its secondary windings connected to the electrodes of the gas discharge tube and the DC source and primary windings connected to the source of sinusoidal alternating current.

In an alternative embodiment of the present invention the apparatus for regulating the light emitting power of a gas laser of the chemical element vapour type comprises a DC source adapted to be connected to the electrodes of the gas discharge tube and, in accordance with the invention, a source of sinusoidal alternating voltage having a frequency adjustable within the range of frequencies of unsteady oscillations of the medium of the laser, connectable to the electrodes of the gas discharge tube in parallel with the DC source.

In the last-mentioned embodiment of the present invention, it is further advisable that the apparatus should include a capacitor having one plate thereof connected to an electrode of the gas discharge tube and the other plate connected to the source of sinusoidal alternating voltage, and a resistor connected to said electrode of the gas discharge tube of the laser in series with the DC source.

The present invention will now be described in greater detail with reference to embodiments thereof taken in conjunction with the accompanying drawings, wherein.

Figure 1:
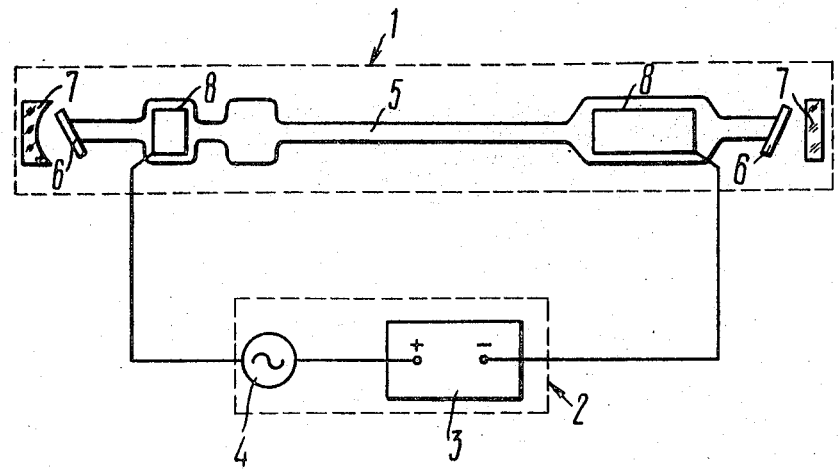
FIG. 1 illustrates a gas laser of the chemical element vapour type, associated with an apparatus for regulating the light emitting power of this laser, in accordance with the invention.

Referring now in particular to the appended drawings, FIG. 1 shows a laser 1 associated with an apparatus 2 for regulating the light emitting power of this laser, comprising a DC source 3 and a source 4 of an AC electric field.

The gas laser includes a gas discharge tube 5 with optical windows 6 inclined at the Brewster angle to the optical line of the laser 1, and mirrors 7 defining an optical cavity.

Mounted internally of the gas discharge tube 5 are electrodes 8 connected into the output electric circuit of the sources 3 and 4, respectively, of direct and alternating current. The electrodes 8 define therebetween the discharge gap of the gas discharge tube 5. Introduced into the gas discharge tube are helium and cadmium, the latter evaporating when a DC gas discharge is initiated, whereby a mixture of helium and cadmium vapours is formed in the gas discharge tube 5. This mixture is a laser medium capable of stimulated radiation upon initiation of said DC discharge. Another inert gas may be used instead of helium, while cadmium vapours may be substituted with vapours of some other metal or metalloid, of which the mixture with the inert gas forms a laser medium utilized in lasers of the above-mentioned "chemical element vapour" type.

The DC source 3 may be in the form of any suitable known source of stabilized current, provided that this source supplies direct current within a range of 50 to 250 mA and a voltage of 1,000 V to 5,000 V.

The AC source may be in the form of any adjustable generator of sinusoidal alternating current (voltage) having a frequency range equal to that of frequencies of unsteady oscillations of the laser medium upon initiation therein of a DC discharge. In the DC discharge, there occur unsteady oscillations of the laser medium, caused by the difference between the velocities of drift and diffusion of electrons and ions in the electric field produced by the DC source and the currents of electrons and ions at the wall of the discharge tube 5. These unsteady oscillations, in turn, cause non-uniformity of the concentration and temperature of the electrons and ions of the laser medium, whereby the conditions of excitation are different in different portions of the tube.

The frequency of the sinusoidal alternating current (voltage) at which maximum power of the light emission is attained depends on the pressure of the inert gas, on the diameter of the gas discharge tube, as well as on the length of the discharge tube and on the pressure of the metal and metalloid vapours.

In any case, it has been found sufficient that the range of adjustment of the frequency of the source of alternating current (voltage) should be approximately from 40 to 300 kHz.

Figure 2:
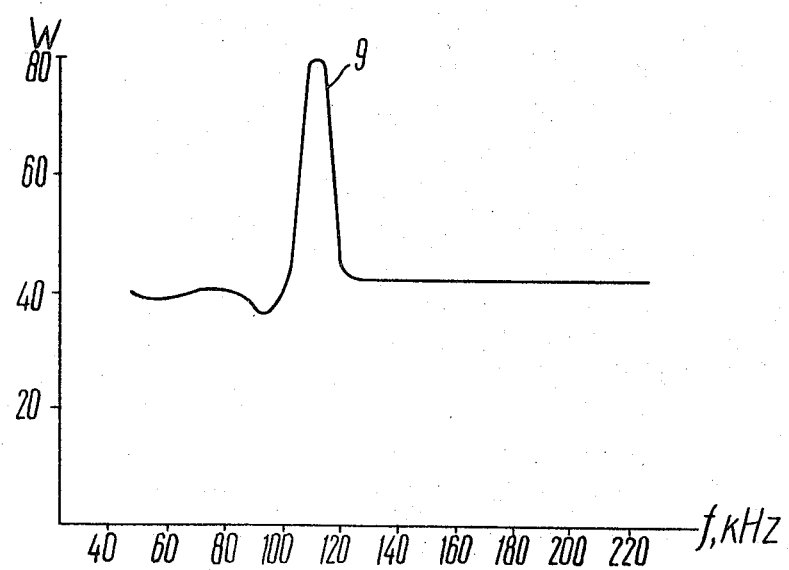
FIG. 2 is a graph showing the variation of the light emitting power of a gas laser having for its medium a mixture of helium and cadmium vapours versus the variation of the frequency of the AC electric field.

In gas lasers, wherein the medium is a mixture of helium and cadmium vapours, the minimum and maximum values of the light emitting power correspond, as can be seen from curve 9 (FIG. 2), to the variation of the frequency of the source 4 from 80 to 110 kHz. As the maximum value of the light emitting power is attained, which in this case is 110 kHz, the noise in the light emission is reduced 100 times.

Figure 3:
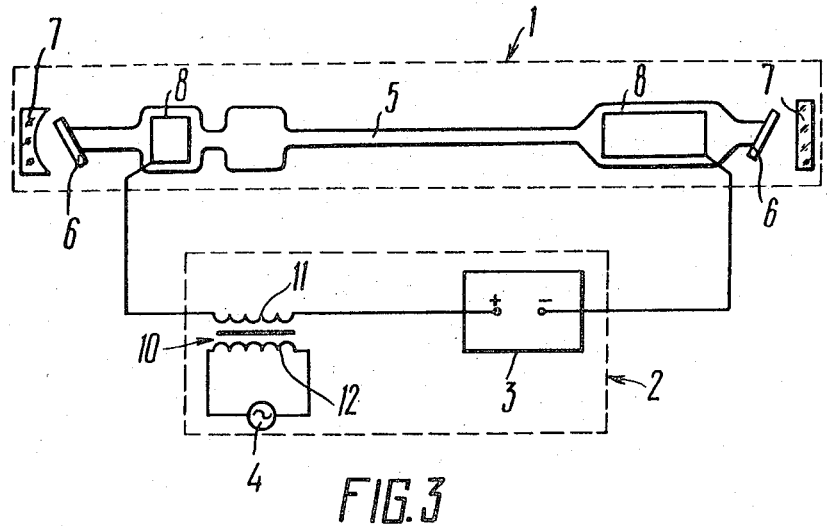
FIG. 3 illustrates schematically a gas laser of the chemical element vapour type, associated with an apparatus for regulating the light emitting power of this laser, comprising a source of sinusoidal alternating current.

When used as the source 4 is an AC source, the apparatus 2 should preferably include a transformer 10 (FIG. 3) having its secondary winding 11 connected to the DC source 3 and the electrode 8, while its primary winding 12 is connected to the AC source 4. The AC source 4 should be selected so that the amplitude of its current is about 0.01 of the amplitude of the current from the DC source.

Figure 4:
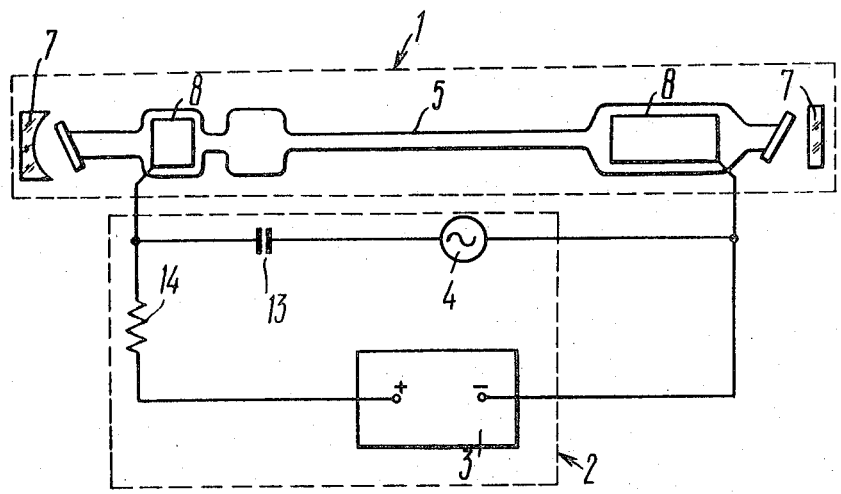
FIG. 4 illustrates schematically a gas laser of the chemical element vapour type, associated with an apparatus for regulating the light emitting power of this laser, comprising a source of sinusoidal voltage.

When used as the source 4 is an AC source, it is advisable to employ the circuit illustrated in FIG. 4. In this circuit, the AC source 4 is connected in parallel with the discharge gap through a capacitor 13, while the source 3 is connected in parallel with the same discharge gap through a resistor 14 included into the output circuit thereof. The AC source should be so selected that the amplitude of its voltage is about 0.01 of that of the DC source.

The essence of the herein-disclosed method resides in the following.

When The DC source 3 is switched on, an electric discharge is produced within the gas discharge tube 5. This discharge excites the laser medium, and stimulated light emission is produced in the cavity, which emission leaves the cavity through one of the mirrors. As has been already mentioned, unsteady oscillations also occur. As soon as the alternating electric field is applied from the source 4, unsteady oscillations pass into steady state and have the frequency of the alternating electric field. When this frequency of the alternating electric field is such that the ratio of the lifetime of the ions of the inert gas to the period of the steady-state oscillations is an odd integer, the concentration and the temperature of the electrons of the laser medium are brought to a higher level. This means that the power of the light emission attains a maximum value.

This means that the power of the light radiation attains a minimum value. Steady-state oscillations and the required light emitting power are achieved with in several oscillation periods, i.e. the regulation of the laser light emitting power is effected with fast response. On the other hand, when the frequency of the alternating electric field is such that the ratio of the lifetime of the ions of the inert gas to the period of the steady-state oscillations is an even integer, the concentration and the temperature of the electrons of the laser medium are brought to a lower level.

What is claimed is:

1. Method of regulating the light emitting power of a laser comprising a cavity and a gas discharge tube having electrodes and filled with a mixture of an inert gas and vapours of chemical elements, which mixture is the laser medium of said laser, consisting in applying a DC field to the electrodes, which field initiates a DC discharge in said laser medium exciting the latter, whereby stimulated light emission is ensured, then applying to the same laser medium an AC field and varying the frequency of the AC field within the range of frequencies of unsteady oscillations of the laser medium upon initiation therein of said DC discharge, whereby the light emitting power is varied.

2. A method as claimed in claim 1, wherein the applied AC field has a frequency variable within a range of about 40 to 220 kHz.

3. A method as claimed in claim 2 for regulating the emission of a laser the laser medium whereof consists of helium and cadmium vapours, wherein the applied AC field has a frequency variable within a range from 80 to 110 kHz.

4. A method as claimed in claim 1, wherein the frequency of the AC field is varied.

5. A method as claimed in claim 4, wherein the amplitude of the electric current of said AC field is about 0.01 of the amplitude of the current of said DC field.

6. A method as claimed in claim 1, wherein the frequency of the voltage of said AC field is varied.

7. A method as claimed in claim 6, wherein the amplitude of said voltage of said AC field is about 0.01 of the amplitude of the voltage of said DC field.

8. An apparatus for regulating the light emitting power of a gas laser including a cavity and a gas discharge tube having electrodes and filled with a mixture of an inert gas and vapours of chemical elements, which mixture is the laser medium of said laser capable of stimulated radiation when excited, comprising a DC source connectable to said electrodes of said gas discharge tube to initiate therein a DC discharge exciting said laser medium, and an AC source with adjustable frequency, adapted to be connected to said electrodes of said gas discharge tube in series with said DC source and adapted to produce sinusoidal oscillations within the range of frequencies of unsteady oscillations of said laser medium upon initiation therein of a DC discharge.

9. An apparatus as claimed in claim 8, comprising a transformer having its secondary windings connected in series with said electrodes of said gas discharge tube and with said DC source, the primary windings of said transformer being connected to said source of sinusoidal current.

10. An apparatus for regulating the light emitting power of a gas laser including a cavity and a gas discharge tube having electrodes and filled with a mixture of an inert gas and vapours of chemical elements, which mixture is the laser medium of said laser capable of stimulated radiation when excited, comprising a DC source connectable to said electrodes of said gas discharge tube to initiate therein a DC discharge exciting said laser medium, and an AC source with adjustable frequency, adapted to be connected to said electrodes of said gas discharge tube in parallel with said DC source and to produce sinusoidal signals within the range of frequencies of unsteady oscillations of said laser medium upon initiation therein of a DC discharge.

11. An apparatus as claimed in claim 10, wherein said AC source is connected to one of said electrodes directly and to the other via a capacitor, said DC source including a resistor in the output circuit thereof.

* * * * *